(12) United States Patent
Phillips et al.

(10) Patent No.: US 7,678,010 B2
(45) Date of Patent: Mar. 16, 2010

(54) 8-SPEED TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 336 days.

(21) Appl. No.: 11/867,854

(22) Filed: Oct. 5, 2007

(65) Prior Publication Data
US 2008/0261754 A1    Oct. 23, 2008

Related U.S. Application Data

(60) Provisional application No. 60/912,958, filed on Apr. 20, 2007.

(51) Int. Cl.
*F16H 3/62* (2006.01)
(52) U.S. Cl. .......... 475/275; 475/323; 475/330
(58) Field of Classification Search .......... 475/275, 475/323, 330
See application file for complete search history.

(56) References Cited

U.S. PATENT DOCUMENTS

| | | | |
|---|---|---|---|
| 4,070,927 A | 1/1978 | Polak | |
| 4,709,594 A | 12/1987 | Maeda | |
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 2008/0261756 A1* | 10/2008 | Carey et al. | 475/276 |
| 2008/0261761 A1* | 10/2008 | Phillips et al. | 475/276 |

FOREIGN PATENT DOCUMENTS

JP    09-126283    5/1997

* cited by examiner

*Primary Examiner*—David D Le
(74) *Attorney, Agent, or Firm*—Quinn Law Group, PLLC

(57) ABSTRACT

The transmission has a plurality of members that can be utilized in powertrains to provide at least eight forward speed ratios and at least one reverse speed ratio. The transmission includes four planetary gear sets having five torque-transmitting devices, four fixed interconnections and a grounded member. The powertrain includes an engine and torque converter that is continuously connected to at least one of the planetary gear members and an output member that is continuously connected with another one of the planetary gear members. The five torque-transmitting devices provide interconnections between various gear members, and with a stationary member, and are operated in combinations of two to establish at least eight forward speed ratios and at least one reverse speed ratio.

11 Claims, 2 Drawing Sheets

| | | | 80 | 82 | 84 | 85 | 86 |
|---|---|---|---|---|---|---|---|
| GEAR STATE | Gear Ratio | Ratio Step | Gnd PC2 | PC1 R3 | PC1 S4 | R1 S4 | PC3 S3 |
| Rev | -2.433 | | x | | | | x |
| N | | -0.58 | o | | | | |
| 1st | 4.204 | | x | | x | | |
| 2nd | 2.967 | 1.42 | x | | | x | |
| 3rd | 2.124 | 1.40 | x | x | | | |
| 4th | 1.421 | 1.49 | | x | | x | |
| 5th | 1.142 | 1.24 | | | x | x | |
| 6th | 1.000 | 1.14 | | x | | | x |
| 7th | 0.851 | 1.17 | | | x | | x |
| 8th | 0.706 | 1.21 | | | | x | x |

8-SPEED TRANSMISSION

CROSS REFERENCE TO RELATED APPLICATION

This application claims the benefit of U.S. Provisional Patent Application No. 60/912,958, filed Apr. 20, 2007, and which is hereby incorporated by reference in its entirety.

TECHNICAL FIELD

The present invention relates to a power transmission having four planetary gear sets that are controlled by five torque-transmitting devices to provide at least eight forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

The present invention provides an improved transmission having four planetary gear sets controlled to provide at least eight forward speed ratios and at least one reverse speed ratio.

The transmission family of the present invention has four planetary gear sets, each of which includes a first, second and third member, which members may comprise a sun gear, a ring gear, or a planet carrier assembly member, in any order.

In referring to the first, second, third and fourth gear sets in this description and in the claims, these sets may be counted "first" to "fourth" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the third member of the first planetary gear set with the first member of the second planetary gear set.

A second interconnecting member continuously connects the second member of the third planetary gear set with the second member of the fourth planetary gear set.

A third interconnecting member continuously connects the third member of the second planetary gear set with the first member of the third planetary gear set.

A fourth interconnecting member continuously connects the second member of the second planetary gear set with the third member of the fourth planetary gear set.

The first member of the first planetary gear set is continuously connected with the stationary member (transmission housing/casing).

The input member is continuously connected with the second member of the first planetary gear set. The output member is continuously connected with the second member of the third planetary gear set.

A first torque-transmitting device, such as a brake, selectively connects the second member of the second planetary gear set with the stationary member (transmission housing/casing).

A second torque-transmitting device, such as a clutch, selectively connects the second member of the first planetary gear set with the third member of the third planetary gear set.

A third torque-transmitting device, such as a clutch, selectively connects the second member of the first planetary gear set with the first member of the fourth planetary gear set.

A fourth torque-transmitting device, such as a clutch, selectively connects the third member of the first planetary gear set with the first member of the fourth planetary gear set.

A fifth torque-transmitting device, such as a clutch, selectively connects the second member of the third planetary gear set with the first member of the third planetary gear set.

The five torque-transmitting devices are selectively engageable in combinations of two to yield at least eight forward speed ratios and at least one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission in accordance with the present invention;

FIG. 1b is a truth table and chart depicting some of the operating characteristics of the powertrain shown in FIG. 1a.

DESCRIPTION OF THE PREFERRED EMBODIMENT

Figures 1A, 1B:
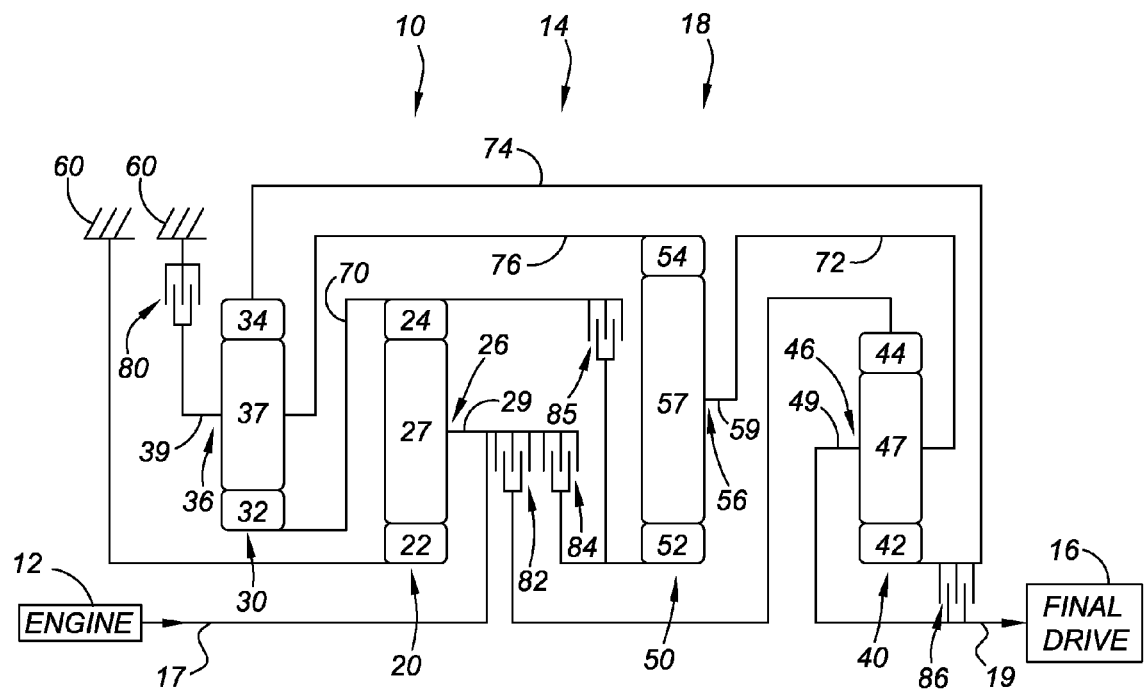

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and are disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on a carrier member 59 and disposed in meshing relationship with both the ring gear member 54 and the sun gear member 52.

The planetary gear arrangement also includes five torque-transmitting devices 80, 82, 84, 85 and 86. The torque-transmitting device 80 is a stationary-type torque-transmitting device, commonly termed reaction clutch or brake. The torque-transmitting devices 82, 84, 85 and 86 are rotating-type torque-transmitting devices, commonly termed clutches.

The input member 17 is continuously connected with the planet carrier assembly member 26 of the planetary gear set 20. The output member 19 is continuously connected with the planet carrier assembly member 46 of the planetary gear set 40. The sun gear member 22 of the planetary gear set 20 is continuously connected with the transmission housing 60.

A first interconnecting member 70 continuously connects the ring gear member 24 of the planetary gear set 20 with the sun gear member 32 of the planetary gear set 30. A second interconnecting member 72 continuously connects the planet carrier assembly member 46 of the planetary gear set 40 with the planet carrier member 56 of the planetary gear set 50. A third interconnecting member 74 continuously connects the ring gear member 34 of the planetary gear set 30 with the sun gear member 42 of the planetary gear set 40. A fourth interconnecting member 76 continuously connects the planet carrier assembly member 36 of the planetary gear set 30 with the ring gear member 54 of the planetary gear set 50.

A first torque transmitting device, such as brake 80, selectively connects the planet carrier assembly member 36 of the planetary gear set with the transmission housing 60. A second torque-transmitting device, such as clutch 82, selectively connects the planet carrier assembly member 26 of the planetary gear set 20 with the ring gear member 44 of the planetary gear set 40. A third torque-transmitting device, such as clutch 84, selectively connects the planet carrier assembly member 26 of the planetary gear set 20 with the sun gear member 52 of the planetary gear set 50. A fourth torque-transmitting device, such as clutch 85, selectively connects the ring gear member 24 of the planetary gear set 20 with the sun gear member 52 of the planetary gear set 50. A fifth torque-transmitting device, such as clutch 86, selectively connects the planet carrier assembly member 46 of the planetary gear set 40 with the sun gear member 42 of the planetary gear set 40.

As shown in FIG. 1b, and in particular the truth table disclosed therein, the torque-transmitting devices are selectively engaged in combinations of two to provide at least eight forward speed ratios and at least one reverse speed ratio all with single transition sequential shifts and including two overdrive ratios.

As set forth above, the engagement schedule for the torque-transmitting devices is shown in the truth table of FIG. 1b. The chart of FIG. 1b describes the gear ratios and ratio steps that are attained in the above described transmission. For example, the step ratio between the first and second forward speed ratios is 1.42, while the step ratio between the reverse speed ratio and first forward ratio is −0.58.

Figure 1C:
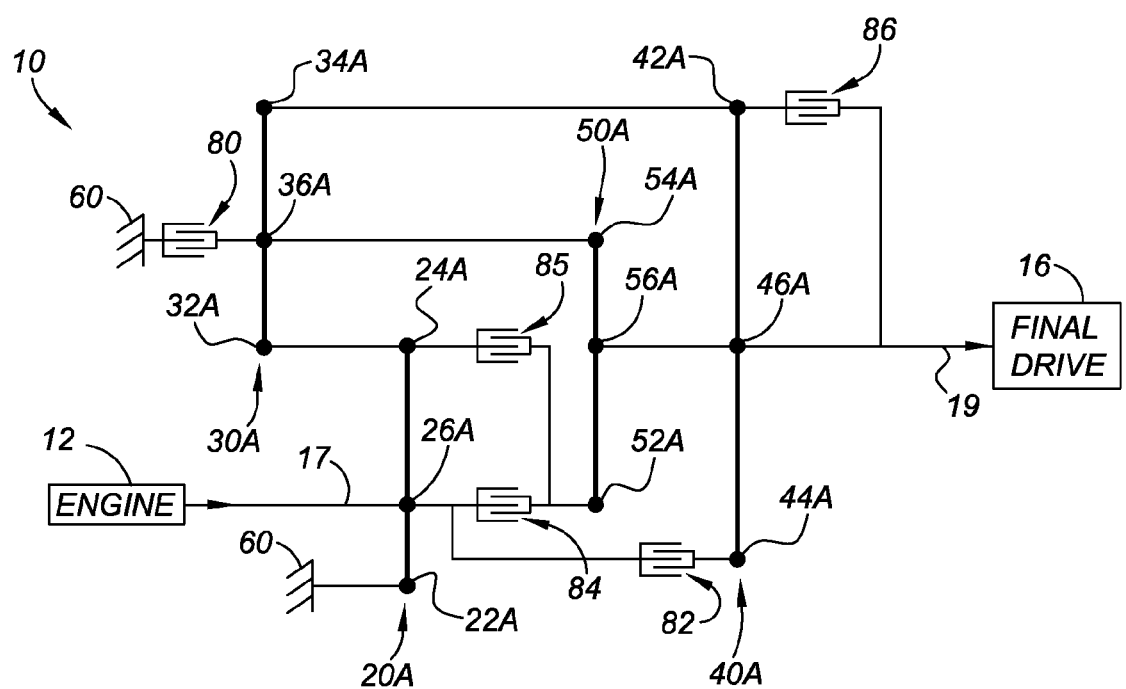
FIG. 1c is a schematic representation of the powertrain of FIG. 1a depicted in lever diagram form.

Referring to FIG. 1c, the embodiment of powertrain 10 depicted in FIG. 1a is illustrated in a lever diagram format. A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

The powertrain 10 includes an input member 17 continuously connected with the engine 12, an output member 19 continuously connected with the final drive 16, a first planetary gear set 20A having three nodes: a first node 22A, a second node 26A and a third node 24A; a second planetary gear set 30A having three nodes: a first node 32A, a second node 36A and a third node 34A; a third planetary gear set 40A having three nodes: a first node 42A, a second node 46A and a third node 44A; and a fourth planetary gear set 50A having three nodes: a first node 52A, a second node 56A and a third node 54A.

The input member 17 is continuously connected with the node 26A and the output member 19 is continuously connected with the node 46A. The node 22A is continuously connected with the transmission housing 60.

The node 24A is continuously connected with the node 32A. The node 46A is continuously connected with the node 56A. The node 34A is continuously connected with the node 42A. The node 36A is continuously connected with the node 54A.

A first torque-transmitting device, such as brake 80, selectively connects node 36A with the transmission housing 60. A second torque-transmitting device, such as clutch 82, selectively connects the node 26A with node 44A. A third torque-transmitting device, such as clutch 84, selectively connects node 26A with node 52A. A fourth torque-transmitting device, such as clutch 85, selectively connects the node 24A with the node 52A. A fifth torque-transmitting device, such as clutch 86, selectively connects the node 46A with the node 42A.

To establish ratios, two torque-transmitting devices are engaged for each gear state. The engaged torque-transmitting devices are represented by an "X" in each respective row in FIG. 1b. For example, to establish reverse gear, the brake 80 and clutch 86 are engaged. The brake 80 engages the node 36A with the transmission housing 60. The clutch 86 engages the node 46A with the node 42A. Likewise, the eight forward ratios are achieved through different combinations of clutch engagement as per FIG. 1b.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   first, second, third and fourth planetary gear sets each having first, second and third members;
   a first interconnecting member continuously connecting said third member of said first planetary gear set with said first member of said second planetary gear set;
   a second interconnecting member continuously connecting said second member of said third planetary gear set with said second member of said fourth planetary gear set;
   a third interconnecting member continuously connecting said third member of said second planetary gear set with said first member of said third planetary gear set;
   a fourth interconnecting member continuously connecting said second member of said second planetary gear set with said third member of said fourth planetary gear set;
   said first member of said first planetary gear set being continuously connected with a stationary member; and
   five torque transmitting devices, wherein each of the devices selectively interconnects a member of said planetary gear sets with another member of said planetary gear sets or with a stationary member said five torque-transmitting devices being engaged in combinations of two to establish at least eight forward speed ratios and at least one reverse speed ratio between said input member and said output member.

2. The transmission of claim 1, wherein a first of said five torque-transmitting devices is operable for selectively connecting said second member of said second planetary gear set with said stationary member.

3. The transmission of claim 2, wherein a second of said five torque-transmitting devices is operable for selectively connecting said second member of said first planetary gear set with said third member of said third planetary gear set.

4. The transmission of claim 3, wherein a third of said five torque-transmitting devices is operable for selectively connecting said second member of said first planetary gear set with said first member of said fourth planetary gear set.

5. The transmission of claim 4, wherein a fourth of said five torque-transmitting devices is operable for selectively connecting said third member of said first planetary gear set with said first member of said fourth planetary gear set.

6. The transmission of claim 5, wherein a fifth of said five torque-transmitting devices is operable for selectively connecting said second member of said third planetary gear set with said first member of said third planetary gear set.

7. The transmission defined in claim 1, wherein one of said five torque-transmitting devices comprises a brake; and the other four of said five torque-transmitting devices comprise clutches.

8. The transmission of claim 1, wherein said first, second and third members of said first, second, third and fourth planetary gear sets comprise a sun gear member, a planet carrier assembly member and a ring gear member, respectively.

9. The transmission of claim 1, wherein said input member is continuously interconnected with said second member of said first planetary gear set, and said output member is continuously interconnected with said second member of said third planetary gear set.

10. A multi-speed transmission comprising:
    an input member;
    an output member;
    first, second, third and fourth planetary gear sets each having first, second and third members;
    said input member being continuously interconnected with said second member of said first planetary gear set;
    said output member being continuously interconnected with said second member of said third planetary gear set;
    said first member of said first planetary gear set being continuously connected with a stationary member;
    a first interconnecting member continuously connecting said third member of said first planetary gear set with said first member of said second planetary gear set;
    a second interconnecting member continuously connecting said second member of said third planetary gear set with said second member of said fourth planetary gear set;

a third interconnecting member continuously connecting said third member of said second planetary gear set with said first member of said third planetary gear set;

a fourth interconnecting member continuously connecting said second member of said second planetary gear set with said third member of said fourth planetary gear set;

a first torque-transmitting device selectively connecting said second member of said second planetary gear set with said stationary member;

a second torque-transmitting device selectively connecting said second member of said first planetary gear set with said third member of said third planetary gear set;

a third torque-transmitting device selectively connecting said second member of said first planetary gear set with said first member of said fourth planetary gear set;

a fourth torque-transmitting device selectively connecting said third member of said first planetary gear set with said first member of said fourth planetary gear set;

a fifth torque-transmitting device selectively connecting said second member of said third planetary gear set with said first member of said third planetary gear set;

said torque-transmitting devices being engaged in combinations of two to establish at least eight forward speed ratios and at least one reverse speed ratio between said input member and said output member.

11. A multi-speed transmission comprising:

an input member;

an output member;

first, second, third and fourth planetary gear sets each having a sun gear member, planet carrier assembly member and ring gear member;

said input member being continuously interconnected with said planet carrier assembly member of said first planetary gear set;

said output member being continuously interconnected with said planet carrier assembly member of said third planetary gear set;

said sun gear member of said first planetary gear set being continuously connected with a stationary member;

a first interconnecting member continuously connecting said ring gear member of said first planetary gear set with said sun gear member of said second planetary gear set;

a second interconnecting member continuously connecting said planet carrier assembly member of said third planetary gear set with said planet carrier assembly member of said fourth planetary gear set;

a third interconnecting member continuously connecting said ring gear member of said second planetary gear set with said sun gear member of said third planetary gear set;

a fourth interconnecting member continuously connecting said planet carrier assembly member of said second planetary gear set with said ring gear member of said fourth planetary gear set;

a first torque-transmitting device selectively connecting said planet carrier assembly member of said second planetary gear set with said stationary member;

a second torque-transmitting device selectively connecting said planet carrier assembly member of said first planetary gear set with said ring gear member of said third planetary gear set;

a third torque-transmitting device selectively connecting said planet carrier assembly member of said first planetary gear set with said sun gear member of said fourth planetary gear set;

a fourth torque-transmitting device selectively connecting said ring gear member of said first planetary gear set with said sun gear member of said fourth planetary gear set;

a fifth torque-transmitting device selectively connecting said planet carrier assembly member of said third planetary gear set with said sun gear member of said third planetary gear set;

said torque-transmitting devices being engaged in combinations of two to establish at least eight forward speed ratios and at least one reverse speed ratio between said input member and said output member.

* * * * *